July 13, 1965  L. M. H. KRAFFE DE LAUBAREDE  3,194,273
PLASTIC COATED FABRIC TUBES AND BELTS AND METHOD OF MAKING SAME
Filed Feb. 7, 1961
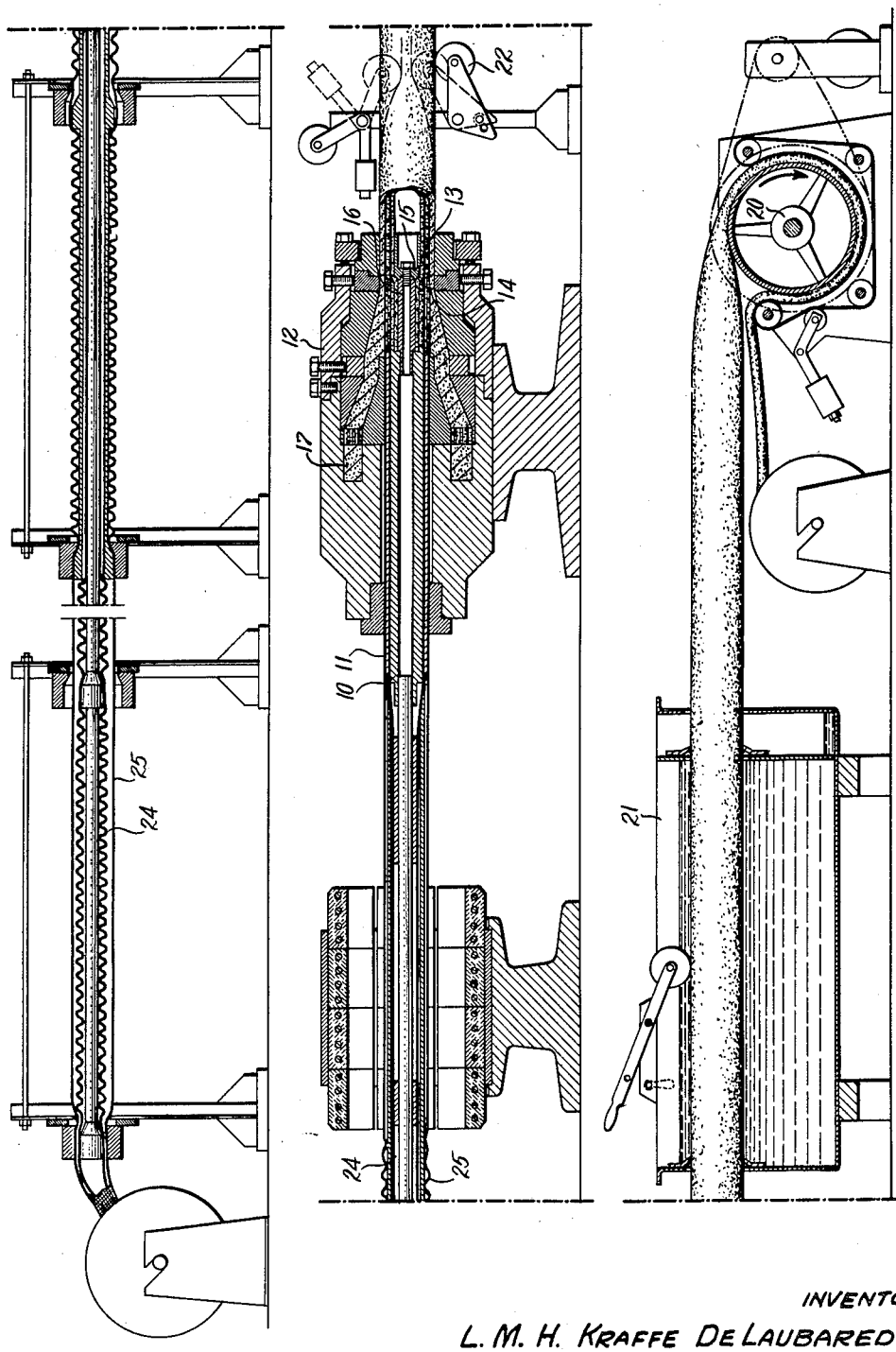
INVENTOR
L. M. H. KRAFFE DE LAUBAREDE
BY Holcombe, Wetherill & Brisebois
ATTORNEYS

3,194,273
PLASTIC COATED FABRIC TUBES AND BELTS AND METHOD OF MAKING SAME

Leonce Marie Henri Kraffe de Laubarede, Boulogne sur Seine, France, assignor, by mesne assignments, to S.A. Plastus, Geneva, Switzerland, a societe anonyme under the laws of Switzerland
Filed Feb. 7, 1961, Ser. No. 87,639
Claims priority, application France, Jan. 10, 1958, 755,642, Patent 1,199,289
10 Claims. (Cl. 138—125)

This application is a continuation-in-part of my prior application Serial No. 785,351, filed January 7, 1959, now Patent No. 2,990,577. In that application I described a machine for impregnating a woven tube with a plastic material so as to make it impervious to fluids.

The present application is directed to the tubes and belts which may be made on such a machine, and to the method of making them.

In essence, the process of making these tubes comprises the steps of progressing a fabric tube over a mandrel which is peripherally recessed and supplying plastic to the exterior of the tube so that it is forced through the interstices thereof into the recess or recesses in the mandrel, thereby coating both the inside and outside of the tube. The process is characterized by the fact that the tube is stretched as it is pulled over the mandrel, thus enlarging the interstices between the threads or yarns composing it, and these interstices are filled with plastic material while so enlarged. After the tube has passed beyond the mandrel, and tension is relieved, the fabric sleeve tends to contract so that its threads or yarns resiliently grip the plastic material in the interstices therebetween. This causes the plastic impregnating coating to adhere firmly to its fabric base, and is highly effective in preventing any leaks due to incompletely filled interstices, or poor adhesion between the impregnating coat and fabric base.

As pointed out in said application S.N. 785,351, the impregnated tubes or belts made according to my invention may comprise a plurality of concentric fabric tubes, suitably impregnated.

One method of carrying out my invention will now be described with reference to the accompanying drawing.

This drawings shows two concentric mandrels 10 and 11 extending into an extrusion head 12. Each mandrel terminates in a cylindrical slitted cage or screen 13 and 14, respectively, and the inner mandrel carries a die 15 positioned just beyond the ends of the cages 13, 14, and supported by a cylindrical member 16 seated in the inner mandrel. There is a substantial clearance between the periphery of the cylindrical member 16 and the inside of the inner cage 13, and between the end of the inner cage 13 and the die 15. These clearances are shown more clearly in the drawings of my copending application S.N. 785,351, now U.S. Patent No. 2,990,577, directed to the structure of this extrusion head. FIGURE 2 of that patent, in particular, shows the head 12 on a larger scale.

Two concentric tubes of woven material 24 and 25 are fed to the mandrels in the manner described in said application S.N. 785,351 and pulled thereover by the winding device 20. Heated plastic material is forced under pressure through the inlet 17 into the head 12. Part of this coats the outside of the tubes and the remainder is forced through the interstices in the fabric tubes and the slits in the cages into the space between the inner cage and the cylindrical member 16 and thence out between the inner cage and die, thus impregnating the tubes and coating the inside of the inner tube.

The impregnated tubes should be passed through a cooling bath 21 before reaching the winding means, and if they are to be flattened into a belt, this should be done by means of the rollers 22, or any other suitable means, before they reach the cooling bath.

It will of course be appreciated that the outer mandrel and cage may be omitted when it is desired to impregnate a single walled rather than a double walled tube.

The essential feature is that the fabric tube must be made of a material having at least some degree of elasticity and that it should be stretched as it passes over the mandrel and cage so that the interstices between the threads or yarns composing the fabric are enlarged at the time the plastic is forced thereinto. Subsequent release of the tension on the fabric after hardening of the plastic causes it to grip the plastic in these interstices quite firmly and leads to an excellent adhesion between fabric and plastic, and a highly impervious tube.

While only the coating material has been referred to as a plastic, it will be appreciated that the fabric may be made of synthetic material as well.

In a particular example, the fabric is a seamless tube woven from the polyethylene terephthalate fiber known commercially as "Tergal" and is composed of woof threads running circumferentially about the tube and warp threads extending longitudinally of the tube.

In a typical tube the warp threads will comprise three 2500 denier strands spun from continuous filaments of Tergal, spaced at 10 warp threads per centimeter.

The size and spacing of the woof threads depends on the diameter of the tube. In the case of a tube having a diameter of 45 mm., for example, the woof threads may be formed from two 2500 denier strands of continuous filament Tergal and two No. 14 (metric) strands spun from relatively short Tergal fibers, and spaced 43 threads per 10 cm.

In the case of a tube having a diameter of 70 mm., the woof threads may comprise three strands spun from 2500 denier continuous filament Tergal, and three No. 14 strands spun from Tergal fibers.

The fabric may, of course, be made of polyesters, or other synthetic materials having at least some elasticity, such as acrylic or superpolyamide fibres, vegetable fibres, or even metal, but must be of a type which is not damaged by the application of a hot molten plastic.

In general, the fabric should be stretched to somewhat less than 25–30% of its elastic limit at the time the plastic impregnating and coating material is applied.

The plastic material may be polyethylene, polyvinyl chloride, or some other suitable conventional plastic coating material.

The flexibility or rigidity of the resulting tube will depend upon the choice of both base fabric and plastic coating material.

In the event it is desired to produce a belt instead of a tube, the impregnated tube is simply rolled flat by suitable means such as rollers 22 before the plastic is permitted to cool. The plastic then binds the opposite sides of the flattened tube together to form a very satisfactory belt having smooth edges which resist fraying and a central layer of plastic material which serves to maintain the belt at a constant length, despite a substantial wearing away of the outer layers of plastic during use, because stretching of the somewhat elastic fabric base is prevented by its adhesion to the inner layer of less elastic plastic material. The belting is, moreover, to a certain extent "prestretched" due to its method of manufacture, so that it has a smaller inherent tendency to stretch than a corresponding belt made by merely coating the opposite sides of a ribbon with plastic material.

This method of making a belt is particularly advantageous because it permits the application of a uniform coating of plastic material to both sides of the belt. In order to thoroughly impregnate a fabric the plastic must be forced through the interstices therein and not merely wiped on to the opposite sides of the fabric. When this is done with a flat fabric, plastic material must be supplied from one side and forced through to the other. If the fabric is travelling as it is being impregnated, the result is to force the fabric against that side of the device through which it is travelling which lies opposite the plastic supply, so that some of the plastic coating on that side tends to be scraped off. This results in an uneven coating.

When applicant's method is used, however, the plastic is forced from all sides into the central space, so that there is no tendency to press the fabric against any part of the apparatus in such a manner as to scrape off part of the coating.

Applicant's invention thus comprises not only in improved belt, but an improved method of manufacturing that belt.

What is claimed is:

1. The method of making an article which comprises the steps of advancing a tubular fabric while subjecting it to an expanding force which enlarges the interstices in said fabric, forcing a hardenable plastic material through said interstices to fill said enlarged interstices and form a coating on the inner surface of the tubular fabric while said material is in a plastic state, said material being applied to the entire circumference of the tube and forced therethrough into the interior of the tube, and ceasing to apply said expanding force, while permitting said material to harden.

2. The method claimed in claim 1 according to which two concentric fabric tubes are simultaneously impregnated, while the wall of one fabric tube is kept radially spaced from the wall of the other.

3. The method of making a belt from a fabric tube composed of a plurality of elastic threads interlaced to define interstices therebetween which comprises the steps of advancing said fabric while applying thereto an expanding force sufficient to enlarge the interstices in said fabric, forcing a hardenable plastic material through said interstices to fill said enlarged interstices and form a coating on the inner surface of said fabric tube while said material is in a plastic state, said material being applied to the entire circumference of the tube and forced therethrough into the interior of the tube, flattening said tube before said material has completely hardened, ceasing the application of said expanding force, and causing said plastic material to harden.

4. The method claimed in claim 3 according to which two concentric fabric tubes are simultaneously impregnated, while the wall of one fabric tube is kept radially spaced from that of the other.

5. A belt comprising a fabric tube composed of a plurality of elastic threads interlaced to define therebetween interstices having a normal size when said threads are free from tension, said tube being flattened to define two opposed sides, and a solidified plastic material which coats said tube and adhesively secures said sides together, said plastic material filling said interstices and keeping them permanently enlarged, so that said threads are kept under permanent tension and resiliently grip the material in said interstices.

6. A belt as claimed in claim 5 comprising two concentric flattened tubes.

7. A belt as claimed in claim 5 in which said fabric tube is seamless.

8. A belt as claimed in claim 5 in which said fabric is woven from a synthetic textile material.

9. A tube composed of a plurality of elastic threads interlaced to define therebetween interstices having a normal size when said threads are free from tension, and a solidified plastic material which coats said tube, said plastic material filling said interstices and keeping them permanently enlarged so that said threads are kept under permanent tension and resiliently grip the material in said interstices.

10. An article composed of a plurality of concentric seamless fabric tubes, each composed of a plurality of elastic threads interlaced to define therebetween interstices having a normal size when said threads are free from tension, and a solidified plastic material which coats said fabric tubes inside and out to render them fluid impervious, said plastic material filling said interstices and keeping them permanently enlarged so that said threads are kept under permanent tension and resiliently grip the material in said interstices.

References Cited by the Examiner

UNITED STATES PATENTS

| | | | |
|---|---|---|---|
| 1,279,601 | 9/18 | Spadone | 154—52.1 |
| 1,870,661 | 8/32 | Vogt | 264—257 XR |
| 2,277,178 | 3/42 | Wermine | 138—55 |
| 2,287,780 | 6/42 | Carman | 154—52.1 |
| 2,324,645 | 7/43 | Prehler | 264—280 XR |
| 2,411,027 | 11/46 | Crosby | 156—140 XR |
| 2,520,699 | 8/50 | Sowerby et al. | 156—148 XR |
| 2,763,316 | 9/56 | Stahl | 154—8 |
| 2,767,431 | 10/56 | De Laubarede | 117—95 |
| 2,807,282 | 9/57 | Watts et al. | 138—76 |
| 2,855,975 | 10/58 | Ritchie et al. | 156—294 XR |
| 2,874,411 | 2/59 | Berquist | 18—14 |
| 2,906,638 | 9/59 | Herman | 117—7 |
| 2,938,566 | 5/60 | Toulmin | 156—431 |
| 2,972,549 | 2/61 | Goldsmith | 117—4 |
| 3,018,800 | 1/62 | Hanssens | 156—294 XR |
| 3,067,803 | 12/62 | Fleury | 156—148 XR |

EARL M. BERGERT, *Primary Examiner.*

CARL F. KRAFFT, *Examiner.*